United States Patent [19]
Swan et al.

[11] Patent Number: 6,100,229
[45] Date of Patent: Aug. 8, 2000

[54] COMPOSITIONS OF 1,1,1,3,3,-PENTAFLUOROPROPANE AND CHLORINATED ETHYLENES

[75] Inventors: Ellen L. Swan, Lancaster; Dennis Michael Lavery, Springville, both of N.Y.

[73] Assignee: AlliedSignal Inc., Morristown, N.J.

[21] Appl. No.: 09/166,800

[22] Filed: Oct. 6, 1998

Related U.S. Application Data

[60] Provisional application No. 60/071,128, Jan. 12, 1998.

[51] Int. Cl.[7] .................. C11D 7/30; C11D 7/50; C23G 5/028; C09K 5/04
[52] U.S. Cl. .................. 510/408; 510/184; 510/273; 252/67; 252/364; 516/8
[58] Field of Search .................. 510/412, 408, 510/184, 273; 252/67, 364; 516/8

[56] References Cited

U.S. PATENT DOCUMENTS

| | | | |
|---|---|---|---|
| 4,898,893 | 2/1990 | Ashida | 521/131 |
| 4,944,846 | 7/1990 | Manzer et al. | 203/1 |
| 5,094,773 | 3/1992 | Manzer et al. | 252/172 |
| 5,096,933 | 3/1992 | Volkert | 521/131 |
| 5,106,527 | 4/1992 | Doerge et al. | 252/172 |
| 5,130,345 | 7/1992 | Li et al. | 521/131 |
| 5,196,137 | 3/1993 | Merchant | 252/172 |
| 5,219,490 | 6/1993 | Basu et al. | 252/171 |
| 5,308,881 | 5/1994 | Londrigan et al. | 521/112 |
| 5,350,777 | 9/1994 | Yuge et al. | 521/117 |
| 5,362,764 | 11/1994 | Londrigan et al. | 521/112 |
| 5,409,625 | 4/1995 | Nappa et al. | 252/67 |
| 5,426,127 | 6/1995 | Doerge | 521/131 |
| 5,433,880 | 7/1995 | Minor et al. | 252/67 |
| 5,441,659 | 8/1995 | Minor | 252/67 |
| 5,461,084 | 10/1995 | Doerge | 521/167 |
| 5,461,177 | 10/1995 | Manzer et al. | 50/178 |
| 5,478,492 | 12/1995 | Barthelemy et al. | 252/171 |
| 5,494,601 | 2/1996 | Flynn et al. | 252/171 |
| 5,496,866 | 3/1996 | Sommerfeld et al. | 521/131 |
| 5,538,659 | 7/1996 | Chisolm et al. | 252/67 |
| 5,552,080 | 9/1996 | Bolmer | 510/412 |
| 5,558,810 | 9/1996 | Minor et al. | 252/67 |
| 5,562,857 | 10/1996 | Werner et al. | 252/67 |
| 5,565,497 | 10/1996 | Godbey et al. | 521/131 |
| 5,574,192 | 11/1996 | Van Der Puy | 570/167 |
| 5,616,819 | 4/1997 | Boyce et al. | 570/167 |
| 5,672,294 | 9/1997 | Lund et al. | 252/67 |
| 5,677,358 | 10/1997 | Lund et al. | 521/131 |
| 5,683,974 | 11/1997 | Lund et al. | 510/177 |
| 5,688,833 | 11/1997 | Lund et al. | 521/98 |
| 5,728,315 | 3/1998 | Singh et al. | 252/67 |
| 5,759,438 | 6/1998 | Lund et al. | 252/182.24 |
| 5,788,886 | 8/1998 | Minor et al. | 252/364 |
| 5,851,977 | 12/1998 | Gorton et al. | 510/512 |
| 5,866,029 | 2/1999 | Lund et al. | 252/67 |

FOREIGN PATENT DOCUMENTS

| | | | |
|---|---|---|---|
| 684687 | 4/1964 | Canada | 260/659 |
| 0 783 017 A2 | 1/1997 | European Pat. Off. . | |
| 0864554 | 9/1998 | European Pat. Off. . | |
| 43 26 469 A1 | 2/1994 | Germany . | |
| WO 91/09077 | 6/1991 | WIPO . | |
| WO 94/02563 | 2/1994 | WIPO . | |
| WO 94/22973 | 10/1994 | WIPO . | |
| WO 94/27939 | 12/1994 | WIPO . | |
| WO 95/04022 | 2/1995 | WIPO . | |
| WO 95/08603 | 3/1995 | WIPO . | |
| WO 95/32935 | 12/1995 | WIPO . | |
| WO 96/10063 | 4/1996 | WIPO . | |
| WO 96/15206 | 5/1996 | WIPO . | |
| WO 97/05089 | 2/1997 | WIPO . | |
| WO 97/05211 | 2/1997 | WIPO . | |
| WO 97/10312 | 3/1997 | WIPO . | |
| WO 97/27163 | 7/1997 | WIPO . | |
| WO 97/31989 | 9/1997 | WIPO . | |
| WO 98/00381 | 1/1998 | WIPO . | |
| WO 98/02484 | 1/1998 | WIPO . | |

OTHER PUBLICATIONS

Jürgen Gmehling et al. *Azeotropic Data*. Part I. VCH, Weinheim (1994) Introduction, no month provided.

*Primary Examiner*—Christine Skane
*Attorney, Agent, or Firm*—Colleen D. Szuch; Marie L. Collazo

[57] ABSTRACT

The invention relates to novel compositions of 1,1,1,3,3-pentafluoropropane and chlorinated ethylenes and more particularly to azeotrope-like compositions based on these compounds which are useful as solvents in aerosol, refrigeration flushing, oxygen system cleaning and vapor degreasing applications.

6 Claims, No Drawings

COMPOSITIONS OF 1,1,1,3,3,-PENTAFLUOROPROPANE AND CHLORINATED ETHYLENES

This application claims the benefit of now abandoned provisional application Ser. No. 60/071,128 filed Jan. 12, 1998.

FIELD OF THE INVENTION

This invention relates to compositions of 1,1,1,3,3-pentafluoropropane and at least one chlorinated ethylene and more particularly to azeotrope-like compositions based on these compounds. These mixtures are useful as solvents for use in aerosol, refrigeration flushing, oxygen system cleaning, and vapor degreasing applications including electronics cleaning.

BACKGROUND OF THE INVENTION

Fluorocarbon based fluids have found widespread use in industry for solvent cleaning and solvents in aerosols for the degreasing and otherwise cleaning of solid surfaces, especially intricate parts and difficult to remove soils.

In its simplest form, vapor degreasing or solvent cleaning consists of exposing a room temperature object to be cleaned to the vapors of a boiling solvent. Vapors condensing on the object provide clean distilled solvent to wash away grease or other contamination. Final evaporation of solvent from the object leaves behind no residue as would be the case where the object is simply washed in liquid solvent.

For difficult to remove soils where elevated temperature is necessary to improve the cleaning action of the solvent, or for large volume assembly line operations where the cleaning of metal parts and assemblies must be done efficiently and quickly, a vapor degreaser is employed. The conventional operation of a vapor degreaser consists of immersing the part to be cleaned in a sump of boiling solvent which removes the bulk of the soil, thereafter immersing the part in a sump containing freshly distilled solvent near room temperature, and finally exposing the part to solvent vapors over the boiling sump which condense on the cleaned part. The part can also be sprayed with distilled solvent before final rinsing.

Azeotropic or azeotrope-like compositions are particularly desired because they do not fractionate upon boiling. This behavior is desirable because in the previously described vapor degreasing equipment in which these solvents are employed, redistilled material is generated for final rinse-cleaning. Thus, the vapor degreasing system acts as a still. Unless the solvent composition exhibits a constant boiling point, i.e., is azeotrope-like, fractionation will occur and undesirable solvent distribution may act to upset the cleaning and safety of processing. Preferential evaporation of the more volatile components of the solvent mixtures, which would be the case if they were not azeotrope-like, would result in mixtures with changed compositions which may have less desirable properties, such as lower solvency towards soils, less inertness towards metal, plastic or elastomer components, and increased flammability and toxicity.

The compositions of the invention may also be useful in aerosol solvent applications of cleaning or deposition of certain types of lubricants, as a dust off, freeze spray or tire inflator. As an aerosol product the material is propelled from an aerosol can using a propellant.

The art is continually seeking new fluorocarbon based mixtures which offer alternatives for the above-described applications. Currently, environmentally acceptable fluorocarbon-based materials are of particular interest because the fully halogenated chlorofluorocarbons have been implicated in causing environmental problems associated with the depletion of the earth's protective ozone layer. Mathematical models have substantiated that hydrofluorocarbons like 1,1,1,3,3-pentafluoropropane (HFC 245fa) will not adversely affect atmospheric chemistry because the contribution to stratospheric ozone depletion and global warming in comparison to the fully halogenated and chlorinated fluorocarbons species is negligible.

The art has looked towards compositions which include fluorocarbon components such as 1,1,2-trichloro-1,2,2-trifluoroethane (CFC-113) and also include components which contribute additionally desired characteristics, such as polar functionality, increased solvency power, and stabilizers. The substitute material must also possess those properties exhibited by the prior art chlorofluorocarbons including chemical stability, low toxicity, and non-flammability.

It is accordingly an object of this invention to provide novel compositions based on 1,1,1,3,3-pentafluoropropane and chlorinated ethylenes (trans 1,2 dichloroethylene, methylene chloride, trichlorethylene, and mixtures thereof), and preferably azeotrope-like compositions, which are useful in solvent and other applications, meeting the above mentioned criteria.

The present compositions are advantageous for the following reasons. The HFC-245fa component has a zero ozone depletion potential and has reasonable solvency characteristics. The chlorinated ethylene component has good solvent properties to enable the cleaning and dissolution of flux resin and oils. Thus, when these components are combined in effective amounts, an efficient, environmentally acceptable azeotrope-like solvent results.

DESCRIPTION OF THE INVENTION

In accordance with the invention, novel compositions comprising effective amounts of 1,1,1,3,3-pentafluoropropane and at least one chlorinated ethylene have been discovered. The invention further relates to azeotrope-like compositions comprising from about 80 to about 99.9 weight percent 1,1,1,3,3-pentafluoropropane and from about 0.1 to about 20 weight percent of a chlorinated ethylene selected from the group consisting of trans-1,2-dichloroethylene, trichloroethylene, methylene chloride, and combinations thereof which boil at about 15.1° C.±0.5° at 760 mmHg.

1,1,1,3,3-pentafluoropropane is a known material, which material and method of preparation is described in WO 95/04022.

The preferred compositions are azeotrope-like because they are essentially constant boiling versus composition and possess essentially identical liquid and vapor compositions over the aforementioned temperature range.

The mixtures of the invention also exhibit zero ozone depletion potential and low atmospheric lifetime hence contributes negligibly to the greenhouse warming effect. This is contrasted with the high ozone depletion potential and correspondingly high greenhouse warming potential of CFC-113.

The compositions of this invention uniquely possess all of the desirable features of an ideal solvent i.e., safe to use, non-flammable, zero ozone depletion potential, and low greenhouse warming effect.

The term "azeotrope-like" is used herein for the preferred mixtures of the invention because in the claimed proportions, the compositions of 1,1,1,3,3-pentafluoropropane and chlorinated ethylenes are constant boiling or essentially constant boiling. All compositions within the indicated ranges, as well as certain compositions outside the indicated ranges, are azeotrope-like, as defined more particularly below.

From fundamental principles, the thermodynamic state of a fluid is defined by four variables: pressure, temperature, liquid composition, and vapor composition, or P-T-X-Y, respectively. An azeotrope is a unique characteristic of a system of two or more components where X and Y are equal at a stated P and T. In practice this means that the components cannot be separated during a phase change, and therefore are useful in solvent and aerosol solvent applications.

For the purposes of this discussion, by azeotrope-like composition is intended to mean that the composition behaves like a true azeotrope in terms of this constant boiling characteristics or tendency not to fractionate upon boiling or evaporation. Thus, in such systems, the composition of the vapor formed during evaporation or upon propulsion from an aerosol can, is identical or substantially identical to the original liquid composition. Hence, during boiling or evaporation, the liquid composition, if it changes at all, changes only slightly. This is contrasted with non-azeotrope-like compositions in which the liquid and vapor compositions change substantially during evaporation or condensation.

One way to determine whether a candidate mixture is azeotrope-like within the meaning of this invention, is to distill a sample thereof under conditions (i.e., resolution—number of plates) which would be expected to separate the mixture into its separate components. If the mixture is non-azeotrope or non-azeotrope-like, the mixture will fractionate, i.e., separate into its various components with the lowest boiling component distilling off first, and so on. If the mixture is azeotrope-like, some finite amount of the first distillation cut will be obtained which contains all of the mixture components and which is constant boiling or behaves as a single substance. This phenomenon cannot occur if the mixture is not azeotrope-like, i.e., it is not part of an azeotrope system.

It follows from the above that another characteristic of azeotrope-like compositions is that there is a range of compositions containing the same components in varying proportions which are azeotrope-like. All such compositions are intended to be covered by the term azeotrope-like as used herein. As an example, it is well known that at different pressures the composition of a given azeotrope will vary at least slightly as does the boiling point of the composition. Thus, an azeotrope of A and B represents a unique type of relationship but with a variable composition depending on the temperature and/or pressure. As is readily understood by persons skilled in the art, the boiling point of an azeotrope will vary with the pressure.

In the process embodiment of the invention, the compositions of the invention may be used to clean solid surfaces by treating said surfaces with said compositions in any manner well known in the art such as by dipping or spraying (aerosol solvent) or use of open or closed vapor degreasing apparatus.

In aerosol solvent applications, the compositions may be sprayed onto a surface by using a propellant. Suitable propellants include chlorofluorocarbons like dichlorodifluoromethane, hydrochlorofluorocarbons like chlorodifluoromethane, hydrofluorocarbons like 1,1,1,2-tetrafluoroethane, ethers like dimethyl ether, hydrocarbons like butane and isobutane, and compressed gases such as air, nitrogen or carbon dioxide.

It should be understood that the present compositions may include additional components so as to form new azeotrope-like compositions. Any such compositions are considered to be within the scope of the present invention as long as the compositions are essentially constant boiling and contain all the essential components described herein.

In addition, the compositions of the invention including the preferred azeotrope-like compositions may include components which may not form new azeotrope-like compositions. Known additives may be used in the present compositions in order to tailor the composition for a particular use. Inhibitors may be added to the present compositions to inhibit decomposition of the compositions; react with undesirable decomposition products of the compositions; and/or prevent corrosion of metal surfaces. Any or all of the following classes of inhibitors may be employed in the invention: alkanols having 4 to 7 carbon atoms, nitroalkanes having 1 to 3 carbon atoms, 1,2-epoxyalkanes having 2 to 7 carbon atoms, phosphite esters having 12 to 30 carbon atoms, ethers having 3 or 4 carbon atoms, unsaturated compounds having 4 to 6 carbon atoms, acetals having 4 to 7 carbon atoms, ketones having 3 to 5 carbon atoms, and amines having 6 to 8 carbon atoms. Other suitable inhibitors will readily occur to those skilled in the art. The inhibitors may be used alone or as mixtures in any proportion. Typically, up to about 2 percent of inhibitor based on the total weight of the azeotrope-like composition may be used.

The present invention is more fully illustrated by the following non-limiting Examples.

EXAMPLES 1–3

The range over which the following compositions exhibit constant boiling behavior was determined using ebulliometry.

1. HFC-245fa/trans 1,2 dichloroethylene
2. HFC-245fa/trichloroethylene
3. HFC-245fa/methylene chloride The ebulliometer used in this experiment consisted of a heated sump. The upper part of the ebulliometer connected to the sump was cooled thereby acting as a condenser for the boiling vapors, allowing the system to operate at total reflux. Measured quantities of HFC-245fa were charged into the ebulliometer and brought to a boil. Then in separate identical experiments, measured amounts of the relevant chlorinated ethylene was titrated into the ebulliometer. The change in boiling point was measured with a platinum resistance thermometer.

The preferred, more preferred and most preferred embodiments for each azeotrope-like composition of the invention are listed in Table I. The proportions/ranges listed in the Table are understood to be prefaced by "about".

| Components | Preferred Range (wt %) | More Preferred Range (wt %) | Most Preferred Range (wt %) | Boiling Point (° C. @ 760 mmHg) |
|---|---|---|---|---|
| HFC-245fa | 99.9–80 | 99–82 | 95–85 | 15.1 + 0.5 |
| trans-1,2 dichloroethylene | 0.1–20 | 1–18 | 5–15 | |
| HFC-245fa | 99.9–95 | 99.5–96 | 99.2–97 | 14.8 + 0.5 |
| trichloroethylene | 0.1–5 | 0.5–4 | 0.8–3 | |
| HFC-245fa | 99.9–95 | 99.8–96 | 99.5–97 | 15.2 + 0.5 |
| methylene chloride | 0.1–5 | 0.2–4 | 0.5–3 | |

| Components | Preferred Range (wt %) | More Preferred Range (wt %) | Most Preferred Range (wt %) | Boiling Point (° C. @ 760 mmHg) |
|---|---|---|---|---|
| Examples 4–7 | | | | |
| HFC-245fa | 99.8–75 | 98.5–78 | 94.2–82 | 14.8 + .8 |
| trans-1,2 dichloroethylene | 0.1–20 | 1–18 | 5–15 | |
| trichloroethylene | 0.1–5 | 0.5–4 | 0.8–3 | |
| HFC-245fa | 99.8–75 | 98.8–78 | 94.5–82 | 14.8 + .8 |
| trans-1,2 dichloroethylene | 0.1–20 | 1–18 | 5–15 | |
| methylene chloride | 0.1–5 | 0.2–4 | 0.5–3 | |
| HFC-245fa | 99.8–90 | 99.3–92 | 98.7–94 | 14.8 + .8 |
| trichloroethylene | 0.1–5 | 0.5–4 | 0.8–3 | |
| methylene chloride | 0.1–5 | 0.2–4 | 0.5–3 | |
| HFC-245fa | 99.7–70 | 98.3–74 | 93.7–79 | 14.8 + .8 |
| trans-1,2 dichloroethylene | 0.1–20 | 1–18 | 5–15 | |
| methylene chloride | 0.1–5 | 0.2–4 | 0.5–3 | |
| trichloroethylene | 0.1–5 | 0.5–4 | 0.8–3 | |

What is claimed:

1. Azeotrope-like compositions consisting essentially of from about 80 to about 99.9 weight percent 1,1,1,3,3-pentafluoropropane and from about 0.1 to about 20 weight percent of trans-1,2-dichloroethylene wherein said compositions boil at about 15.1° C.±0.5° at 760 mmHg.

2. The azeotrope-like compositions of claim 1 consisting essentially of from about 82 to about 99 weight percent 1,1,1,3,3-pentafluoropropane and from about 1 to about 18 weight percent trans-1,2-dichloroethylene.

3. The azeotrope-like compositions of claim 1 consisting essentially of from about 85 to about 95 weight percent 1,1,1,3,3-pentafluoropropane and from about 5 to about 15 weight percent trans-1,2-dichloroethylene.

4. Azeotrope-like compositions consisting essentially of from about 95 to about 99.9 weight percent 1,1,1,3,3-pentafluoropropane and from about 0.1 to about 5 weight percent trichloroethylene wherein said compositions boil at about 14.8° C.±0.5° at 760 mmHg.

5. The azeotrope-like compositions of claim 4 consisting essentially of from about 99.5 to about 96 weight percent 1,1,1,3,3-pentafluoropropane and from about 0.5 to about 4 weight percent trichloroethylene.

6. The azeotrope-like compositions of claim 4 consisting essentially of from about 97 to about 99.2 weight percent 1,1,1,3,3-pentafluoropropane and from about 0.8 to about 3 weight percent trichloroethylene.

* * * * *